(12) United States Patent  
Uehara et al.

(10) Patent No.: US 7,541,703 B2  
(45) Date of Patent: Jun. 2, 2009

(54) ROTARY ELECTRIC MACHINE

(75) Inventors: Nobuaki Uehara, Tokyo (JP); Hiroyuki Akita, Tokyo (JP); Masaki Kato, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 460 days.

(21) Appl. No.: 11/296,326

(22) Filed: Dec. 8, 2005

(65) Prior Publication Data

US 2006/0202573 A1 Sep. 14, 2006

(30) Foreign Application Priority Data

Dec. 13, 2004 (JP) ............................ P2004-360275

(51) Int. Cl.  
*H02K 11/00* (2006.01)
(52) U.S. Cl. ...................................... 310/68 D; 310/71
(58) Field of Classification Search ............... 310/68 D, 310/71

See application file for complete search history.

(56) References Cited

U.S. PATENT DOCUMENTS 4,321,664 A * 3/1982 Matthai ..................... 363/144

6,867,517 B2 * 3/2005 Kumagai ................. 310/68 D
7,075,201 B2 * 7/2006 Takahashi et al. ......... 310/68 D
2004/0183385 A1 9/2004 Takahashi et al.

FOREIGN PATENT DOCUMENTS

| JP | 2004-135447 A | 4/2004 |
| JP | 2004-197714 | 7/2004 |
| JP | 2004-282905 | 10/2004 |
| JP | 2004-343825 | 12/2004 |

* cited by examiner

*Primary Examiner*—Dang D Le  
(74) *Attorney, Agent, or Firm*—Sughrue Mion, PLLC

(57) ABSTRACT

In a rotary electric machine having a rotary electric machine part and a switching circuit part for performing current control of this rotary electric machine part and a heat-dissipating device for cooling multiple switching devices constituting this switching circuit part, the cooling effect on the switching devices is improved. The rotary electric machine has a switching circuit part for performing current control of a rotary electric machine part and a heat-dissipating device for cooling multiple switching devices constituting this switching circuit part, and the heat-dissipating device is made up of multiple heat sinks arrayed in the circumferential direction of the rotary shaft of the rotary electric machine part so as to surround the rotary shaft and having the multiple switching devices distributed among and mounted upon them.

21 Claims, 6 Drawing Sheets

⇒ : Cooling draft flow

⇒ : Cooling draft flow

ROTARY ELECTRIC MACHINE

BACKGROUND OF THE INVENTION

1. Field of the Invention

This invention relates to a rotary electric machine having a rotary electric machine part, a switching circuit part for performing current control of this rotary electric machine part, and a heat-dissipating device for cooling multiple switching devices constituting this switching circuit part, and particularly to a rotary electric machine to be applied for example to a vehicle-mounted rotary electric machine provided with a power device unit for performing inverter control or the like.

2. Description of the Related Art

In related art, in a rotary electric machine such as a rotary electric machine for mounting in an automotive vehicle, a switching circuit part such as a power device unit for current-controlling a rotary electric machine part by inverter control or the like has been installed remotely from the rotary electric machine part. However, as a result of the switching circuit part (e.g. power device unit) and the rotary electric machine part being installed remotely from each other, the length of a.c. wires electrically connecting these together becomes long, the associated wiring resistance becomes large, and the associated voltage drop becomes large. Consequently, the problem has arisen that the torque of the rotary electric machine falls, or its rotational speed falls. Although the measure of making the wires thick to minimize the increase in wiring resistance is available, in this case weight and cost increase, and restrictions on weight and/or cost mean that there is a limit to how far this measure can be adopted.

Also, installing the switching circuit part (power device unit) and the rotary electric machine part remotely from each other means that a separate space for installing the switching circuit part (power device unit) is needed besides the space where the rotary electric machine part is installed. However, when the rotary electric machine is disposed in a confined space, for example in the engine compartment of a vehicle in which such a rotary electric machine is mounted in practice, it is sometimes difficult to provide a separate space for installing the switching circuit part (power device unit), and this can constitute a layout problem.

A rotary electric machine in which to solve these problems a power device unit (switching circuit part) constituting an inverter is mounted integrally with a rotary electric machine part is set forth in for example Patent Document 1. By the power device unit (switching circuit part) and the rotary electric machine part being integrated, it becomes possible to make the a.c. wiring connecting the two together short, and the associated voltage drop can be reduced. As a result, effects such as improvement of the torque characteristics and the speed characteristics of the rotary electric machine, or reduction of wiring weight, and increased noise resistance can be expected.

Patent Document 1: JP-A-2004-135447 (FIG. 1 and description thereof)

When the power device unit (switching circuit part) is mounted inside the casing of the rotary electric machine, as shown in Patent Document 1, heat-sinking of the switching devices is carried out by a cooling draft being made to flow into the casing by a fan rotating together with the rotor of the rotary electric machine. However, as a result of the power device unit being mounted inside the casing, the shape of the cooling draft flow passage becomes narrow and complicated. Consequently, the problem arises that pressure losses accompanying the flow of the draft increase, the cooling draft volume falls and cooling is not effected adequately, the temperature of the switching devices rises, and this results in breakdown of the switching devices. And, if an attempt is made keep the temperature of the switching devices within a tolerable range, measures such as making the cooling draft passage wide and increasing the cooling draft volume, or making the size of a heat sink large, become necessary, and these result in the problem that the rotary electric machine becomes large.

In a rotary electric machine to be installed in a confined space such as a rotary electric machine for mounting in an automotive vehicle, and particularly among these, in a rotary electric machine having a rotary electric machine part and a switching circuit part for performing current control of this rotary electric machine part and a heat-dissipating device for cooling multiple switching devices constituting the switching circuit part, when the rotary electric machine part and the switching circuit part for performing current control of this rotary electric machine part and the heat-dissipating device for cooling multiple switching devices constituting the switching circuit part are to be installed in a confined space, it is important that the conditions of weight, cost and installation space are taken into account and in particular that steps are taken to maximize cooling effect so that the rotary electric machine does not become large.

SUMMARY OF THE INVENTION

The present invention was made in view of the circumstances described above, and it is an object of the invention to, in a rotary electric machine having a rotary electric machine part and a switching circuit part for performing current control of this rotary electric machine part and a heat-dissipating device for cooling multiple switching devices constituting this switching circuit part, increase the cooling effect on the switching devices.

In a rotary electric machine provided by the invention, in a rotary electric machine having a rotary electric machine part and a switching circuit part for performing current control of this rotary electric machine part and a heat-dissipating device for cooling multiple switching devices constituting this switching circuit part, the heat-dissipating device is made up of multiple heat sinks arrayed in the circumferential direction of the rotary shaft of the rotary electric machine part so as to surround the rotary shaft and having the multiple switching devices distributed among and mounted upon them.

In a rotary electric machine according to this invention, because, in a rotary electric machine having a rotary electric machine part and a switching circuit part for performing current control of this rotary electric machine part and a heat-dissipating device for cooling multiple switching devices constituting this switching circuit part, the heat-dissipating device is made up of multiple heat sinks arrayed in the circumferential direction of the rotary shaft of the rotary electric machine part so as to surround the rotary shaft and having the multiple switching devices distributed among and mounted upon them, there is an effect of the cooling effect on the switching devices improving.

FIRST PREFERRED EMBODIMENT

Figure 1:
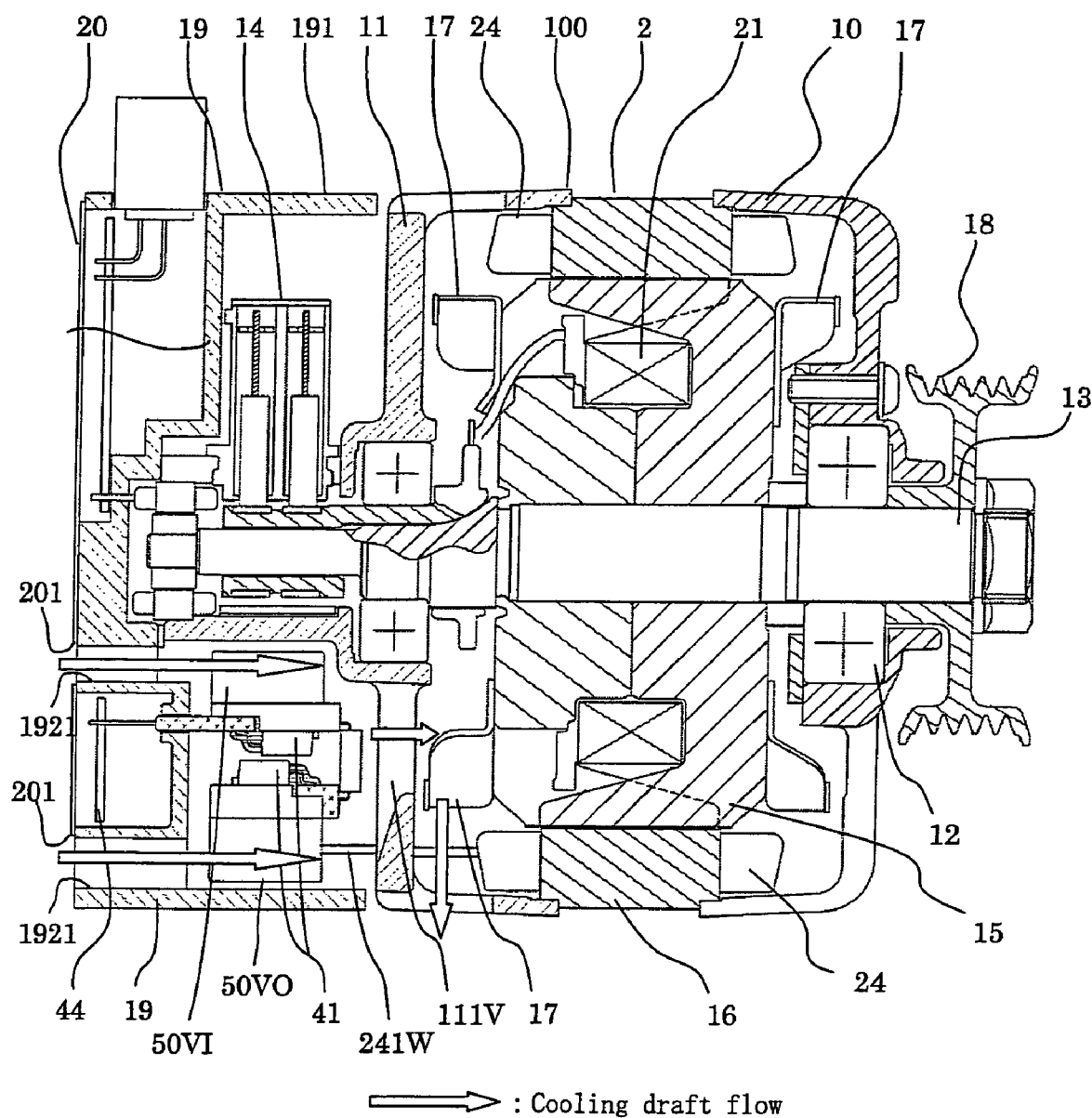
FIG. 1 is a view showing a first preferred embodiment of the invention, and is a vertical sectional side view showing an example of a structure of a rotary electric machine.
Figure 2:
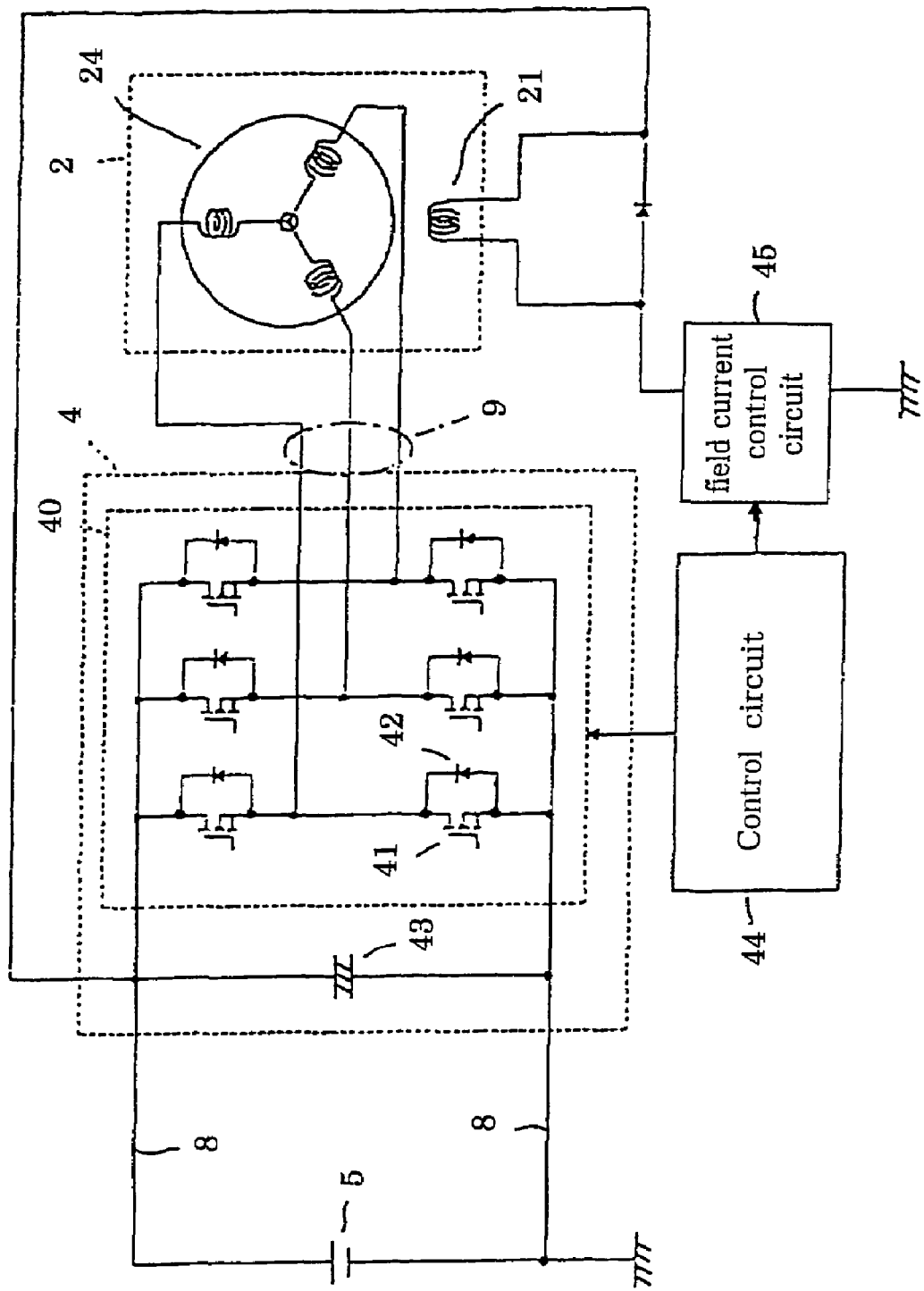
FIG. 2 is a view showing a first preferred embodiment of the invention, and is a view showing an example of an outline circuit for illustrating the operation of the rotary electric machine.
Figure 3:
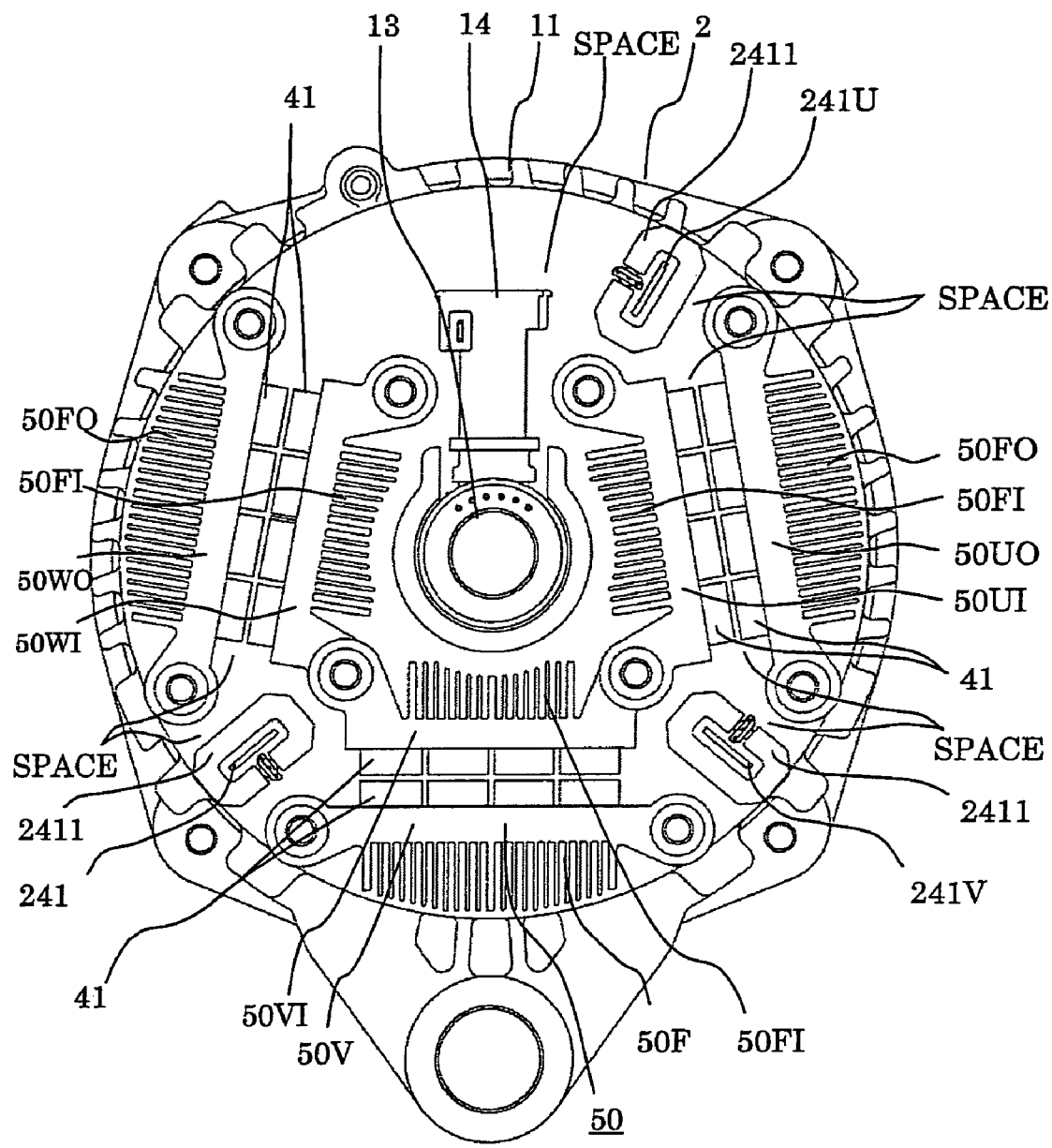
FIG. 3 is a view showing a first preferred embodiment of the invention, and is a plan view showing an example of a disposition of heat sinks of a rotary electric machine.
Figure 4:
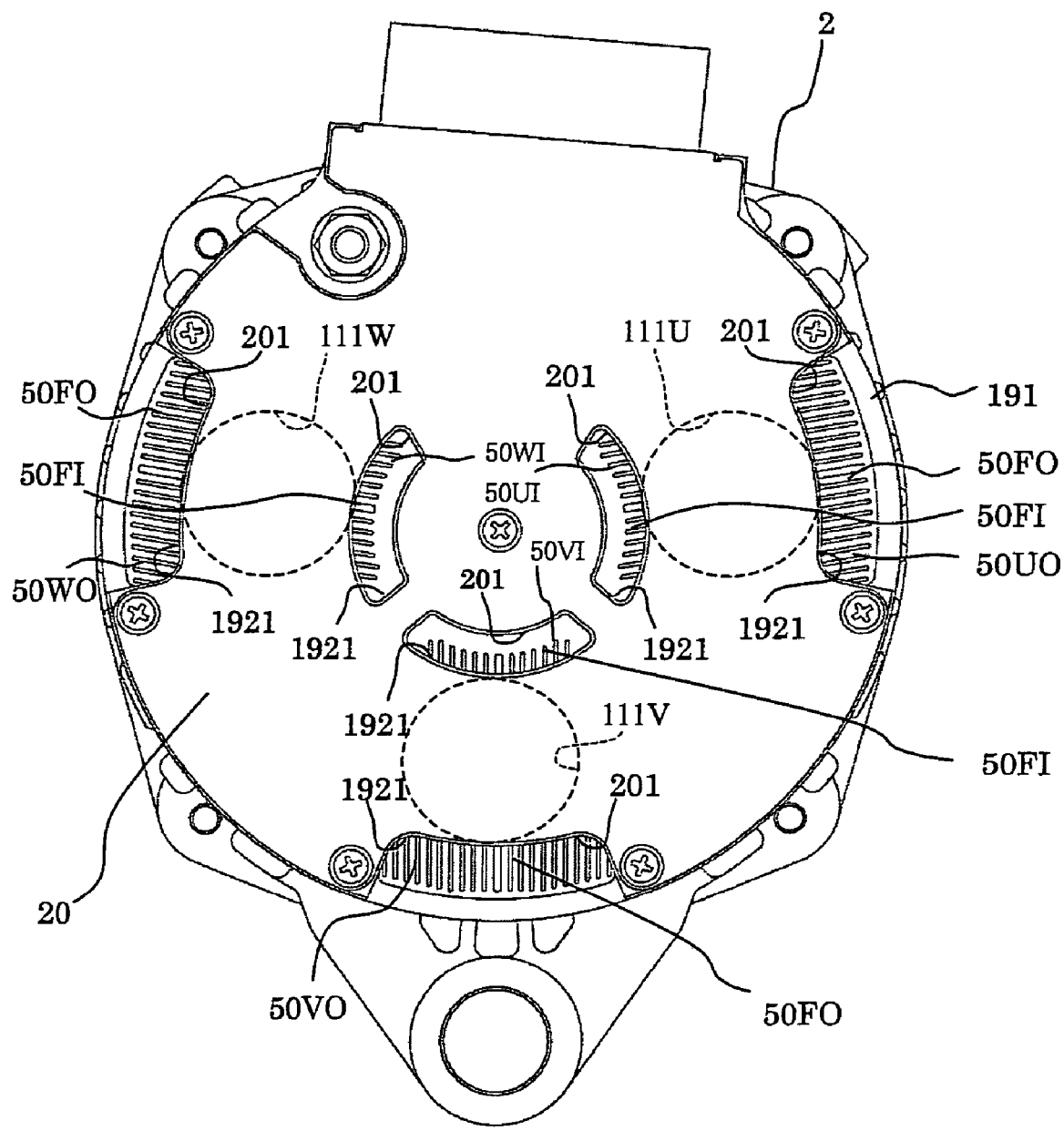
FIG. 4 is a view showing a first preferred embodiment of the invention, and is a plan view showing a rotary electric machine seen from the rear side.

A first preferred embodiment of the invention will be described below on the basis of FIG. 1 through FIG. 4. FIG. 1 is a vertical sectional side view showing an example of a structure of a rotary electric machine, FIG. 2 is a view showing an example of an outline circuit for illustrating the operation of the rotary electric machine, FIG. 3 is a plan view showing an example of a disposition of heat sinks of the rotary electric machine, and FIG. 4 is a plan view showing the rotary electric machine as seen from its rear side. The same reference numerals denote the same parts in all the figures.

In FIG. 1, FIG. 3 and FIG. 4, a rotary electric machine part 2 has a case 100 made up of a front bracket 10 and a rear bracket 11, a rotary shaft 13 rotatably mounted on the case 100 by way of support bearings 12, brushes 14, a rotor 15 fixed to the rotary shaft 13 and having a field winding 21 supplied with electricity by way of the brushes 14, a stator 16 fixed to the case 100 and disposed so as to surround the rotor 15 and having an armature winding 24, a fan 17 made up of centrifugal fans fixed to the axial direction end faces of the rotor 15, and a pulley 18 fixed to a front end of the rotary shaft 13. This rotary electric machine part 2 is connected by way of the pulley 18 and a belt (not shown) to a rotating shaft of an engine (not shown).

In this preferred embodiment, a switching circuit part 4 consisting of a power device unit is installed integrally with or close to the rotary electric machine part 2. Multiple switching devices 41 constituting the switching circuit part 4 and heat sinks 50UI, 50UO, 50VI, 50VO, 50WI, 50WO on which the switching devices 41 are mounted are installed on the rear side of the rear bracket 11. These heat sinks 50UI, 50UO, 50VI, 50VO, 50WI, 50WO constitute a heat-dissipating device 50. The U, V, W in the reference numerals 50UI, 50UO, 50VI, 50VO, 50WI, 50WO refer to a U phase, a V phase and a W phase of a 3-phase alternating current which will be further discussed later, and the I refers to an inner side in the radial direction of the rotary shaft 13 and the O to an outer side in the radial direction of the rotary shaft 13.

A plurality of the switching devices 41 are mounted on a straight-line flat face on the radial direction outer side of each of the heat sinks 50UI, 50VI, 50WI, and a heat-dissipating part 50FI made up of many fins forming a heat transfer surface for dissipating heat conducted from the respective switching devices 41 into a cooling draft is formed on the radial direction inner side. The many fins of the heat-dissipating part 50FI extend in the length direction of the rotary shaft 13 (the direction in which the axis extends), i.e. the direction in which the cooling draft flows, and extend parallel with the radial direction, and the gap between the end faces of the fins near the rotary shaft 13 and the circumferential surface of the rotary shaft 13 is made about the same as the fin spacing, in other words made about the same spacing as in the circumferential direction.

A plurality of the switching devices 41 are mounted on a straight-line flat face on the radial direction inner side of each of the heat sinks 50UO, 50VO, 50WO, and a heat-dissipating part 50FO made up of many fins forming a heat transfer surface for dissipating heat conducted from the respective switching devices 41 into the cooling draft is formed on the radial direction outer side. The many fins of the heat-dissipating part 50FO extend in the length direction of the rotary shaft 13 (the direction in which the axis extends), i.e. the direction in which the cooling draft flows, and extend parallel with the radial direction, and the gap between the end faces of the fins near the inner circumferential surface of an insert case 19 which will be further discussed later and that inner circumferential surface of the insert case 19 is made about the same as the fin spacing, in other words made about the same spacing as in the circumferential direction.

The heat sinks 50UI, 50UO are both heat sinks for the U phase, and the plurality of switching devices 41 on each of these heat sinks are switching devices for the U phase in FIG. 2, which will be further discussed later. Similarly, the heat sinks 50VI, 50VO are both heat sinks for the V phase, and the plurality of switching devices 41 on each of these heat sinks are switching devices for the V phase in FIG. 2, which will be further discussed later. And similarly, the heat sinks 50WI, 50WO are both heat sinks for the W phase, and the plurality of switching devices 41 on each of these heat sinks are switching devices for the W phase in FIG. 2, which will be further discussed later.

An insert case 19 on which is mounted a control circuit board 44a carrying a control circuit 44 for switch-controlling the switching devices of the switching circuit part 4 and thereby preforming current control of the rotary electric machine part, and a cover 20 for covering a rear-side opening of the insert case 19, are disposed on the rear side of the switching circuit part 4.

The insert case 19 is made up of a cylindrical outer wall part 191 coaxial with the rotary shaft 13 and a partition wall part 192 extending in the radial direction between the rotary shaft 13 and the outer wall part 191, and is fixed to the rear bracket 11.

The outer wall part 191 surrounds the heat sinks 50UI, 50UO, 50VI, 50VO, 50WI, 50WO, the brushes 14, and lead wires 241U, 241V, 241W of the armature winding 24. That is, the heat sinks 50UI, 50UO, 50VI, 50VO, 50WI, 50WO and the brushes 14 are disposed so as to be positioned in a common plane in the radial direction in the space between the outer wall part 191 and the rotary shaft 13.

The control circuit 44 is disposed in the space enclosed by the outer wall part 191, the partition wall part 192 and the cover 20 and shielded from the outside environment.

As shown in FIG. 4, cooling draft inlet holes 201 directly facing the heat-dissipating parts 50FI, 50FI, 50FI, 50FO, 50FO, 50FO of the heat sinks 50UI, 50UO, 50VI, 50VO, 50WI, 50WO in the length direction of the rotary shaft 13 are provided in the cover 20. And airflow holes 1921 directly facing the heat-dissipating parts 50FI, 50FI, 50FI, 50FO, 50FO, 50FO of the heat sinks 50UI, 50UO, 50VI, 50VO, 50WI, 50WO in the length direction of the rotary shaft 13 and overlapping with the cooling draft inlet holes 201 in the length direction of the rotary shaft 13 are provided in the partition wall part 192.

And, as shown with dashed lines in FIG. 4, an airflow hole 111U corresponding to the heat sinks 50UI, 50UO, an airflow hole 111V corresponding to the heat sinks 50VI, 50VO, and an airflow hole 111W corresponding to the heat sinks 50WI, 50WO are provided in the rear bracket 11.

The rotary electric machine has the rotary electric machine part 2, the switching circuit part 4 (to be discussed later with reference to FIG. 2) for performing current control of this rotary electric machine part 2, and the heat-dissipating device 50 for cooling the multiple switching devices 41 constituting this switching circuit part 4, and the heat-dissipating device 50 is made up of the multiple heat sinks 50UI, 50VI, 50WI (50UO, 50VO, 50WO) with their respective multiple switching devices 41 mounted thereto and arrayed in a common plane surrounding the rotary shaft 13 of the rotary electric machine part 2 in the circumferential direction of the rotary shaft 13 so as to surround the rotary shaft 13. In other words, the heat sinks are provided divided up into a plurality of heat sinks (50UI, 50VI 50WI (50UO, 50VO, 50WO)) in the circumferential direction, and are disposed approximately all the way around the circumferential direction. Consequently, pressure losses of the cooling draft as it flows can be reduced and fall in the cooling draft volume minimized, and the cooling effect on the switching devices 41 increases. And, draft noise associated with draft flow resistance can also be suppressed.

Spaces are formed between the heat sinks adjacent in the circumferential direction of the rotary shaft 13 (between the 50UI and the 50VI, between the 50VI and the 50WI, between the 50WI and the 50UI (between the 50UO and the 50VO, between the 50VO and the 50WO, between the 50WO and the 50UO)), and the lead wires 241 of the rotary electric machine part 2 are disposed inside these spaces. Thus, the space around the rotary shaft 13 can be made use of effectively, and it is possible to achieve reduced size in the radial direction.

The brushes 14 for supplying electricity to the rotor 15 of the rotary electric machine part 2 and the multiple heat sinks 50UI, 50VI, 50WI, (50UO, 50VO, 50WO) are arrayed in a common plane surrounding the rotary shaft 13 of the rotary electric machine part 2 in the circumferential direction of the rotary shaft 13 so as to surround the rotary shaft 13. Thus, the space around the rotary shaft 13 can be made use of effectively, and it is possible to achieve reduced size in the radial direction.

The plurality of heat sinks arrayed in the circumferential direction of the rotary shaft 13 so as to surround the rotary shaft 13 and having the multiple switching devices 41 distributed among and mounted upon them are arrayed in the radial direction of the rotary shaft (50UI, 50VI, 50WI and 50UO, 50VO, 50WO). In other words, the heat sinks are provided divided up into a plurality of heat sinks in the radial direction (50UI, 50VI, 50WI and 50UO, 50VO, 50WO) and arrayed approximately all the way along the radial direction. Consequently, it is possible to reduce pressure losses of the cooling draft as it flows and suppress associated fall in the cooling draft volume, and the cooling effect on the switching devices 41 improves. And, draft noise associated with draft flow resistance can also be suppressed.

The shapes of the heat sinks arrayed in the circumferential direction of the rotary shaft 13 (50UI and 50VI and 50WI, 50UO and 50VO and 50WO) are identical or similar, and the shapes of the heat sinks arrayed in the radial direction of the rotary shaft 13 (50UI and 50UO, 50VI and 50VO, 50WI and 50WO) are non-identical and dissimilar. Therefore, in the circumferential direction the cooling effect on the switching devices 41 is uniform, and in the radial direction the cooling effect can be made uniform by the heat sink shapes being changed in accordance with the draft passage structure. And, pressure losses of the cooling draft as it flows also become uniform, and draft flow drop and worsening of draft noise can be suppressed.

Spaces are formed between the heat sinks adjacent in the radial direction of the rotary shaft 13 (between 50UI and 50UO, between 50VI and 50VO, between 50WI and 50WO), and the switching devices 41 mounted on these adjacent heat sinks are disposed in these spaces. Consequently, the cooling draft volume through the heat-dissipating parts 50FI, 50FO of the heat sinks 50UI, 50UO, 50VI, 50VO, 50WI, 50WO increases and the cooling effect on the switching devices 41 improves.

Draft passages of cooling drafts for cooling the heat sinks 50UI, 50UO, 50VI, 50VO, 50WI, 50WO are provided in correspondence with the heat sinks, and the heat-dissipating parts 50FI, 50FO of the respective heat sinks are positioned in these draft passages. Thus the cooling draft passages are also arrayed in the circumferential direction like the heat sinks, it is possible to reduce pressure losses of the cooling draft as it flows and suppress associated fall in the cooling draft volume, and the cooling effect on the switching devices improves. And, draft noise associated with draft flow resistance can also be suppressed.

The cooling draft airflow resistance of the spaces between the heat sinks adjacent in the circumferential direction of the rotary shaft 13 has been made greater than the cooling draft airflow resistance of the flow passages in which the heat-dissipating parts 50FI, 50FO of the heat sinks are positioned. Thus it is possible to prevent cooling draft from flowing into the spaces between the heat sinks adjacent in the circumferential direction of the rotary shaft 13, where it will not contribute to cooling, and the cooling draft volume flowing through the heat-dissipating parts 50FI, 50FO of the heat sinks consequently falling, and by a corresponding amount the cooling draft volume flowing through the heat-dissipating parts 50FI, 50FO of the heat sinks is greater and the cooling effect on the switching devices improves.

The cooling draft airflow resistance of the spaces between the heat sinks adjacent in the radial direction of the rotary shaft 13 has been made greater than the cooling draft airflow resistance of the flow passages in which the heat-dissipating parts 50FI, 50FO of the heat sinks are positioned. Thus it is possible to prevent cooling draft from flowing into the spaces between the heat sinks adjacent in the radial direction of the rotary shaft 13, where it will not contribute to cooling, and the cooling draft volume flowing through the heat-dissipating parts 50FI, 50FO of the heat sinks consequently falling, and by a corresponding amount the cooling draft volume flowing through the heat-dissipating parts 50FI, 50FO of the heat sinks is greater and the cooling effect on the switching devices improves.

The heat sinks 50UI, 50UO, 50VI, 50VO, 50WI, 50WO are cooled by the cooling draft created by the centrifugal fan 17, which has the center of rotation of the rotary shaft 13 as its center of rotation, and the cooling draft airflow resistance to the cooling drafts of the heat sinks 50UI, 50VI, 50WI on the radial direction inner side has been made smaller than the cooling draft airflow resistance to the cooling drafts of the heat sinks 50UO, 50VO, 50WO on the radial direction outer side. Consequently, since if the fan 17 is a centrifugal fan the generated pressure on the central side in the radial direction is large, the airflow volume through the heat-dissipating parts 50FI of the heat sinks on the radial direction inner side (the central side) and the airflow volume through the heat-dissipating parts 50FO of the heat sinks on the radial direction outer side (the non-central side) can be balanced, and the heat-dissipation capacities can be made uniform.

The heat sinks 50UI, 50UO, 50VI, 50VO, 50WI, 50WO are cooled by the cooling draft created by the centrifugal fan 17, which has the center of rotation of the rotary shaft 13 as its center of rotation, and the heat transfer area of heat transfer to the cooling drafts of the heat sinks 50UI, 50VI, 50WI on the radial direction inner side has been made smaller than the heat transfer area of heat transfer to the cooling drafts of the heat sinks 50UO, 50VO, 50WO on the radial direction outer side. Consequently, since if the fan 17 is a centrifugal fan the generated pressure near the center in the radial direction is large, the heat dissipation from the heat-dissipating parts 50FI of the heat sinks on the radial direction inner side (the central side) and the heat dissipation from the heat-dissipating parts 50FO of the heat sinks on the radial direction outer side (the non-central side) can be balanced, the temperature distribution can be made uniform, and as a result the maximum temperature can be kept down.

The cooling draft inlet holes 201 of the cooling drafts for cooling the heat sinks are disposed in the proximity of the cooling draft inflow sides of the heat sinks. Thus it is possible to reduce the pressure losses accompanying the airflow from the cooling draft inlet holes 201 to the cooling draft inflow sides of the heat sinks, and by a corresponding amount the cooling draft volume becomes greater and the cooling effect on the switching devices improves.

The above-mentioned current control is UVW 3-phase current control, and the multiple heat sinks arrayed in the circumferential direction of the rotary shaft 13 so as to surround the rotary shaft 13 and having the multiple switching devices 41 distributed among and mounted upon them are U-phase heat sinks 50UI, 50UO on which U-phase switching devices 41 are mounted, V-phase heat sinks 50VI, 50VO on which V-phase switching devices 41 are mounted, and W-phase heat sinks 50WI, 50WO on which W-phase switching devices 41 are mounted. Because the amounts of heat produced by the switching devices of the respective phases U, V, W are equal, and furthermore the cooling capacities of the heat sinks arrayed divided into three in the circumferential direction are also equal, there is no bias of temperature distribution among the phases U, V, W, and the cooling construction can be made efficient.

The heat sinks 50UI, 50UO, 50VI, 50VO, 50WI, 50WO of the respective phases are arrayed in an approximate triangle shape (50UI and 50VI and 50WI (50UO and 50VO and 50WO) in the circumferential direction of the rotary shaft 13 so as to surround the rotary shaft 13. Accordingly, because the heat sinks 50UI, 50UO, 50VI, 50VO, 50WI, 50WO can be laid out so as to surround the rotary shaft 13 in the circumferential direction and also over a wide range throughout the circumferential direction, the layout characteristic of the heat sinks 50UI, 50UO, 50VI, 50VO, 50WI, 50WO improves, the volume occupied by the switching devices 41 and the heat sinks 50UI, 50UO, 50VI, 50VO, 50WI, 50WO can be made minimal, and size increase of the rotary electric machine can be prevented.

The multiple switching devices 41 and the heat-dissipating device 50 are disposed adjacent to the rotary electric machine part 2 in the length direction of the rotary shaft 13, and the area occupied by the switching devices 41 and the heat-dissipating device 50 in the radial direction of the rotary shaft 13 has been kept within the area occupied by the rotary electric machine part 2 in the radial direction. Accordingly, size increase of the rotary electric machine in its radial direction can be prevented.

Next, in FIG. 2, which is an outline circuit diagram for illustrating the operation of the rotary electric machine part 2 having the switching circuit part 4, the rotary electric machine part 2 has the armature winding 24 on the stator 16 and the field winding 21 on the rotor 15, and, as in FIG. 1 discussed earlier, the pulley 18 connected to its rotor 15 is connected to a rotating shaft of an engine (not shown) by a belt (not shown). Here, the armature winding 24 is constructed by Y-connecting coils of the 3 phases (U phase, V phase, W phase). The switching circuit part (power device unit) 4 has an inverter module 40, made up of switching devices (power transistors, MOSFETs, IGBTs or the like) 41 and diodes 42 connected to the switching devices 41 in parallel, and a condenser 43.

In this inverter module 40, the switching operations of the individual switching devices 41 are controlled by commands from the control circuit 44. And the control circuit 44 also controls a field magnet current passed through the field winding 21 of the stator by controlling a field current control circuit 45.

In the rotary electric machine part 2 having the switching circuit part 4, on starting of the engine, d.c. power is supplied to the switching circuit part 4 from a battery 5 via d.c. wiring 8. Then, the control circuit 44 ON/OFF-controls the switching devices 41 of the inverter module 40 so that the d.c. power is converted to 3-phase a.c. power. And this 3-phase a.c. power is supplied via a.c. wiring 9 to the armature winding 24 of the rotary electric machine part 2. A turning magnetic field is created around the field winding 21 of the rotor 15 by the field current being supplied by the field current control circuit 45, this drives the rotor 15 to rotate, and by way of the rotary electric machine pulley, the belt, a crank pulley and a clutch the engine is started.

On the other hand, when the engine starts, the turning force of the engine is transmitted to the rotary electric machine part 2 by way of the crank pulley, the belt and the pulley on the rotary electric machine. As a result, the rotor 15 is rotationally driven and a 3-phase a.c. voltage is induced in the armature winding 24. Here, the switching devices 41 are ON/OFF-controlled by the control circuit 44, and the 3-phase a.c. power induced in the armature winding 24 is converted into d.c. power and used to charge the battery 5.

Cooling of the switching devices 41 is effected, in the rotary electric machine part 2 of FIG. 1, by a cooling draft created by the fan 17 fixed to the rotor 15 being blown over the heat sinks 50UI, 50UO, 50VI, 50VO, 50WI, 50WO on which the switching devices 41 are mounted. The cooling draft created by the fan 17 is drawn in through the rear-side cooling draft inlet holes 201, goes via the airflow holes 1921 in the partition wall part 192 and passes through the heat-dissipating parts 50FI, 50FO of the heat sinks 50UI, 50UO, 50VI, 50VO, 50WI, 50WO, goes via the airflow holes 111U, 111V, 111W in the rear bracket 11, and is blown out radially by the fan 17 from the center of rotation of the fan 17 to radially outward of the rotor 15.

FIG. 3 is a plan view of the rotary electric machine part 2 of FIG. 1 seen from the rear side with the insert case 19 and the cover 20 removed, and as shown in this FIG. 3, the multiple heat sinks (50UI, 50VI, 50WI) (50UO, 50VO, 50WO) with their respective multiple switching devices 41 mounted thereto are arrayed in the circumferential direction of the rotary shaft 13 of the rotary electric machine part 2 so as to surround the rotary shaft 13 in a common plane surrounding the rotary shaft 13. In other words, the heat sinks are disposed divided up into a plurality of heat sinks (50UI, 50VI 50WI (50UO, 50VO, 50WO)) in the circumferential direction, and are disposed approximately all the way around the circumferential direction. And, to match this disposition of the heat sinks (heat-dissipating device) 50, the cooling draft passage is also divided in the circumferential direction into multiple passages so as to correspond with the heat sinks, and almost all of the cooling draft created by the fan 17 is used for cooling the heat sinks in the cooling draft passages. The airflow resistance to the cooling drafts in the cooling draft passages is low, and cooling of the heat sinks can be effected efficiently.

Because the heat sinks 50UI, 50VI, 50WI (50UO, 50VO, 50WO) and the cooling draft passages constitute causes of pressure losses of the cooling draft as it flows with the fan 17, it is important from the point of view of efficient cooling to reduce their airflow resistance as much as possible and increase the flow volume through the heat-dissipating parts 50FI, 50FO of the heat sinks 50UI, 50VI, 50WI (50UO, 50VO, 50WO). By the heat sinks 50UI, 50VI, 50WI (50UO, 50VO, 50WO) and their cooling draft passages being disposed in parallel with respect to the fan 17, the airflow resistance is distributed and the overall pressure loss is reduced. And because as a result of this the airflow volume flowing through the heat-dissipating parts 50FI, 50FO of the heat sinks increases and cooling effect increases, measures such as making the area of the heat transfer surfaces of the heat-dissipating parts 50FI, 50FO of the heat sinks large or making the size of the fan 17 large to obtain cooling effect can be kept to a minimum and consequently size increase of the rotary electric machine part 2 as a whole can be prevented. And, as a consequence of the heat sinks 50UI, 50VI, 50WI (50UO, 50VO, 50WO) and the cooling draft passages being disposed distributed in the circumferential direction, the sources of noise arising due to the drafts flowing are also distributed, and this gives rise to an effect of reducing the noise of the rotary electric machine part 2 as a whole.

And, the switching devices 41 and the heat sinks (50UI, 50VI, 50WI and 50UO, 50VO, 50WO) are arrayed divided up in the approximate radial direction, and the cooling draft passages are also divided up. By this means it is possible to distribute the pressure losses in the radial direction as well and minimize fall in cooling draft volume. And, the number of the switching devices 41 mounted on each heat sink becomes low and thermal interference between switching devices 41 is suppressed, which is advantageous from the point of view of cooling. Also, as a result of the faces on which the switching devices 41 of the heat sinks 50UI, 50VI, 50WI on the radial direction inner side and the heat sinks 50UO, 50VO, 50WO on the radial direction outer side are mounted being brought face-to-face, as shown in FIG. 3, rationalization such as making the electrical interconnections of the switching devices 41 short can be achieved.

And, as a result of parts such as the lead wires 241 of the stator 16 and a current sensor 2411 being disposed in the spaces between the heat sinks adjacent in the circumferential direction among the heat sinks 50UI, 50VI, 50WI (50UO, 50VO, 50WO) arrayed divided up in the circumferential direction, and airflow holes not being provided in the parts of the rear bracket 11, the insert case 19 and the cover 20 facing these spaces in the rotary shaft length direction so that the spaces are sealed in the rotary shaft length direction by the rear bracket 11, the insert case 19 and the cover 20, the airflow resistance encountered by the cooling draft passing through the spaces is made large compared to the airflow resistance encountered by the cooling draft passing through the heat-dissipating parts 50FI, 50FO of the heat sinks, or close to infinite. By this means it is possible to minimize any fall of cooling draft volume through the heat-dissipating parts 50FI, 50FO of the heat sinks caused by the cooling draft flowing anywhere other than over the heat transfer surfaces of the heat-dissipating parts 50FI, 50FO, and heat dissipation by the heat sinks 50UI, 50VI, 50WI (50UO, 50VO, 50WO) can be effected efficiently. For a similar reason, as a result of the switching devices 41 being installed in the radial-direction gaps between the heat sinks (50UI, 50VI, 50WI and 50UO, 50VO, 50WO) arrayed divided up in the radial direction, the airflow resistance encountered by the cooling draft in the spaces where these switching devices 41 are is made large compared to the airflow resistance encountered by the cooling draft passing through the heat-dissipating parts 50FI, 50FO, or close to infinite.

Of the heat sinks 50UI, 50VI, 50WI, 50UO, 50VO, 50WO arrayed divided up in the circumferential direction and the radial direction, the heat sinks in a circumferential direction array relationship are all of a substantially identical or similar shape. By this means it is possible to make the airflow resistance of the heat transfer surfaces of the heat-dissipating parts 50FI, 50FO of the heat sinks uniform in the circumferential direction, and it is possible to minimize dispersion of the temperatures of the switching devices 41 caused by nonuniformity of cooling effect. And, the heat sinks in a radial direction array relationship are of non-identical and non-similar shapes, and the shapes of the heat sinks in the radial direction array relationship can be changed in accordance with the shapes of the cooling draft passages. By this means it is possible to adjust the cooling draft volumes flowing through the heat-dissipating parts 50FI, 50FO of the heat sinks and the amounts of heat dissipated from their heat transfer surfaces, and it is possible to make uniform the cooling effect on the heat sinks in the radial direction array relationship.

In this preferred embodiment, a centrifugal fan is used as the fan 17. Because generally with a centrifugal fan the draft volume is small (the static pressure rise is small) on the non-central side compared to the central side, when heat sinks 50UI, 50VI, 50WI, and 50UO, 50VO, 50WO are arrayed divided up in the radial direction, the draft volume of the cooling draft flowing through the heat-dissipating part 50FO of the heat sink on the non-central side (the radial direction outer side) is small compared to that of the heat-dissipating part 50FI on the central side (the radial direction inner side). However, in this preferred embodiment, the airflow resistance of the heat-dissipating part 50FI of the heat sink on the central side is large compared to that of the heat-dissipating part 50FO of the heat sink on the non-central side, and consequently the cooling draft volumes of the heat-dissipating parts 50FI, 50FO of the heat sinks in the radial direction array relationship become uniform and their cooling effects also are made uniform. And, the fin areas of the heat-dissipating part 50FI of the heat sink on the central side are small compared to the fin areas of the heat-dissipating part 50FO on the non-central side, the amount of heat dissipated from the heat transfer surface of the heat-dissipating part 50FI of the heat sink on the central side is smaller than the amount of heat dissipated from the heat transfer surface of the heat-dissipating part 50FO of the heat sink on the non-central side, and the cooling effects of the heat-dissipating parts 50FI, 50FO of the heat sinks in the radial direction array relationship can be made uniform.

The heat sinks 50UI, 50UO, 50VI, 50VO, 50WI, 50WO are divided up into three in the circumferential direction and each provided with electrode parts of the phases U, V, W. By the heat produced by the switching devices 41 of the phases U, V, W being dissipated by the heat sinks 50UI, 50VI, 50WI (50UO, 50VO, 50WO) arrayed divided up into three in the circumferential direction, the switching devices 41 of the phases U, V, W can be cooled equally, and this is advantageous from the point of view of minimizing dispersion in the temperatures of the switching devices 41.

And, by the heat sinks 50UI, 50VI, 50WI (50UO, 50VO, 50WO) arrayed divided up into three being disposed in an approximate triangle shape, the layout characteristic of the heat sinks 50UI, 50VI, 50WI (50UO, 50VO, 50WO)

improves, the volume occupied in the rotary electric machine part 2 by the heat sinks 50UI, 50VI, 50WI (50VO, 50UO, 50WO) can be made minimal, and size increase of the rotary electric machine can be prevented.

FIG. 4 is a plan view of the rotary electric machine part 2 of FIG. 1 seen from the rear side with the insert case 19 and the cover 20 fitted. As shown in the figure, airflow holes 1921 and inlet holes 201 for allowing a cooling draft to enter are provided in the insert case 19 and the cover 20 covering it. These airflow holes 1921 and inlet holes 201 are disposed so as to be close to the heat-dissipating parts 50FI, 50FO of the heat sinks 50UI, 50UO, 50VI, 50VO, 50WI, 50WO and face them directly in the rotary shaft length direction. By this means the cooling draft passages from these airflow holes 1921 and inlet holes 201 to the heat-dissipating parts 50FI, 50FO of the heat sinks are made simple, pressure losses caused by bends in the draft flow can be reduced, flow volume fall is minimized and cooling is enhanced.

SECOND PREFERRED EMBODIMENT

Figure 5:
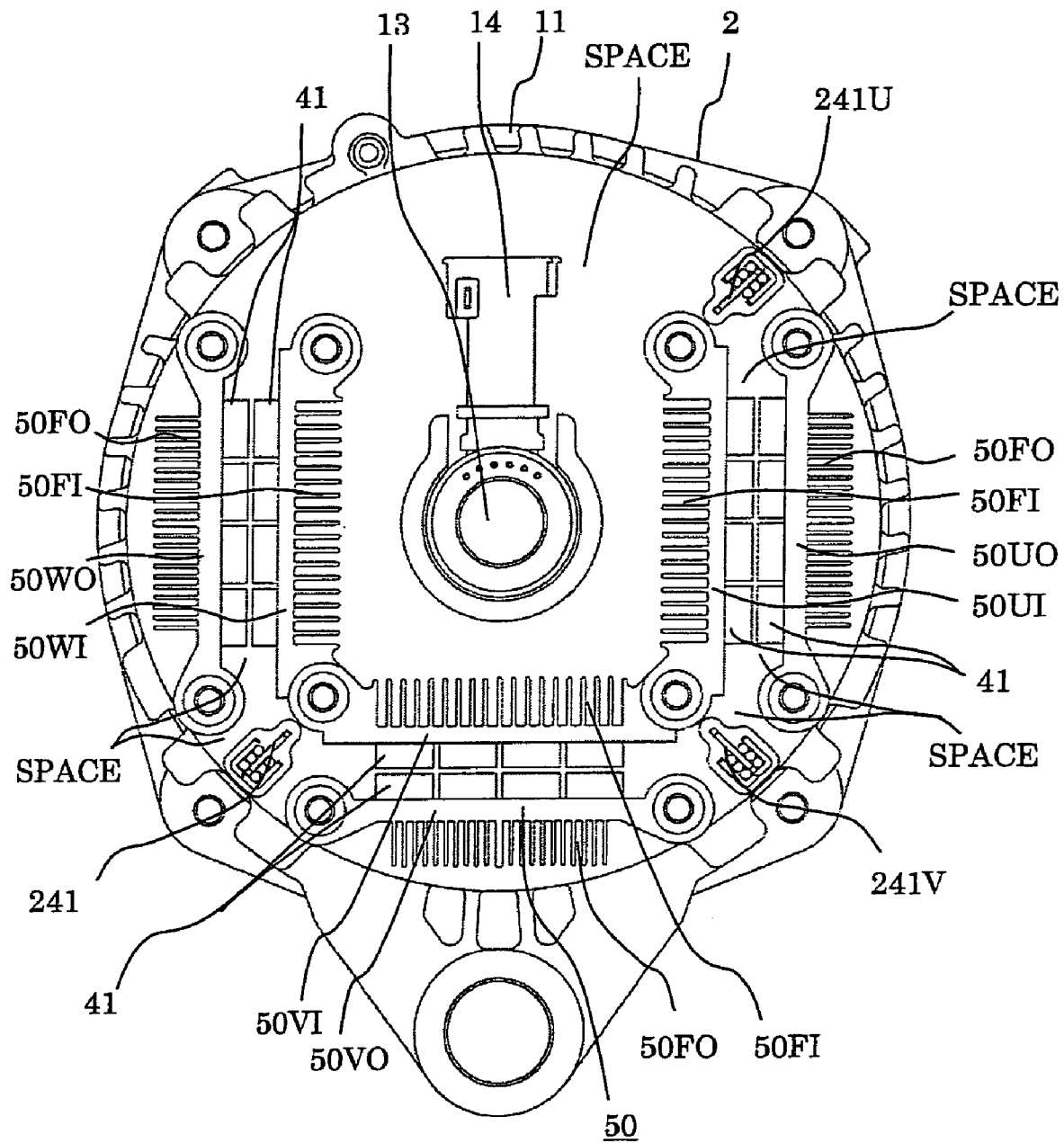
FIG. 5 is a view showing a second preferred embodiment of the invention, and is a plan view showing an example of a disposition of heat sinks in a rotary electric machine.

A second preferred embodiment of the invention will now be described, on the basis of FIG. 5. FIG. 5 is a plan view of a rotary electric machine part 2 according to this second preferred embodiment of the invention seen from the rear side. In FIG. 5, parts the same as or equivalent to parts in FIG. 1 to FIG. 4 have been given the same reference numerals as in FIG. 1 to FIG. 4, and in the following description of this second preferred embodiment of the invention mainly the parts different from the foregoing first preferred embodiment of the invention will be described, and other description will be omitted.

As in this second preferred embodiment, the heat sinks 50UI, 50UO, 50VI, 50VO, 50WI, 50WO and the switching devices 41 mounted on the heat sinks may be disposed in an approximate U shape in the circumferential direction. That is, the heat sinks 50UI, 50UO and 50VI, 50VO and 50WI, 50WO of the different phases may be arrayed in an approximate U shape so as to surround the rotary shaft 13 in the circumferential direction of the rotary shaft 13. And, the shapes of the fins of the heat sinks 50UI and 50UO, 50VI and 50VO, 50WI and 50WO arrayed in the radial direction, differently from in the first preferred embodiment described above, are substantially identical or similar shapes. And, the heat sinks 50UI, 50UO, 50VI, 50VO, 50WI, 50WO are all of a substantially identical or similar shape. The rest of the construction is the same as in the foregoing first preferred embodiment.

In this second preferred embodiment, as in the first preferred embodiment, the heat sinks 50UI, 50VI, 50WI (50UO, 50VO, 50WO) are arrayed divided up into a plurality in a substantially circumferential direction, and to match this construction of heat sinks, the cooling draft passage is also divided up in a substantially circumferential direction. Because of this, as in the first preferred embodiment described above, the airflow resistance encountered by the cooling draft is distributed and the overall pressure loss decreases. As a result, the draft volume flowing through the heat-dissipating parts 50FI, 50FO of the heat sinks increases and cooling effect improves. And, the noise of the rotary electric machine as a whole also decreases. Also, in FIG. 5, by the heat sinks 50UI, 50UO, 50VI, 50VO, 50WI, 50WO the switching devices 41 mounted on the heat sinks being arrayed in an approximate U shape surrounding the rotary shaft 13 in its circumferential direction, the volume occupied in the rotary electric machine part 2 by the heat sinks 50UI, 50UO, 50VI, 50VO, 50WI, 50WO can be minimized, and size increase of the rotary electric machine can be prevented.

THIRD PREFERRED EMBODIMENT

Figure 6:
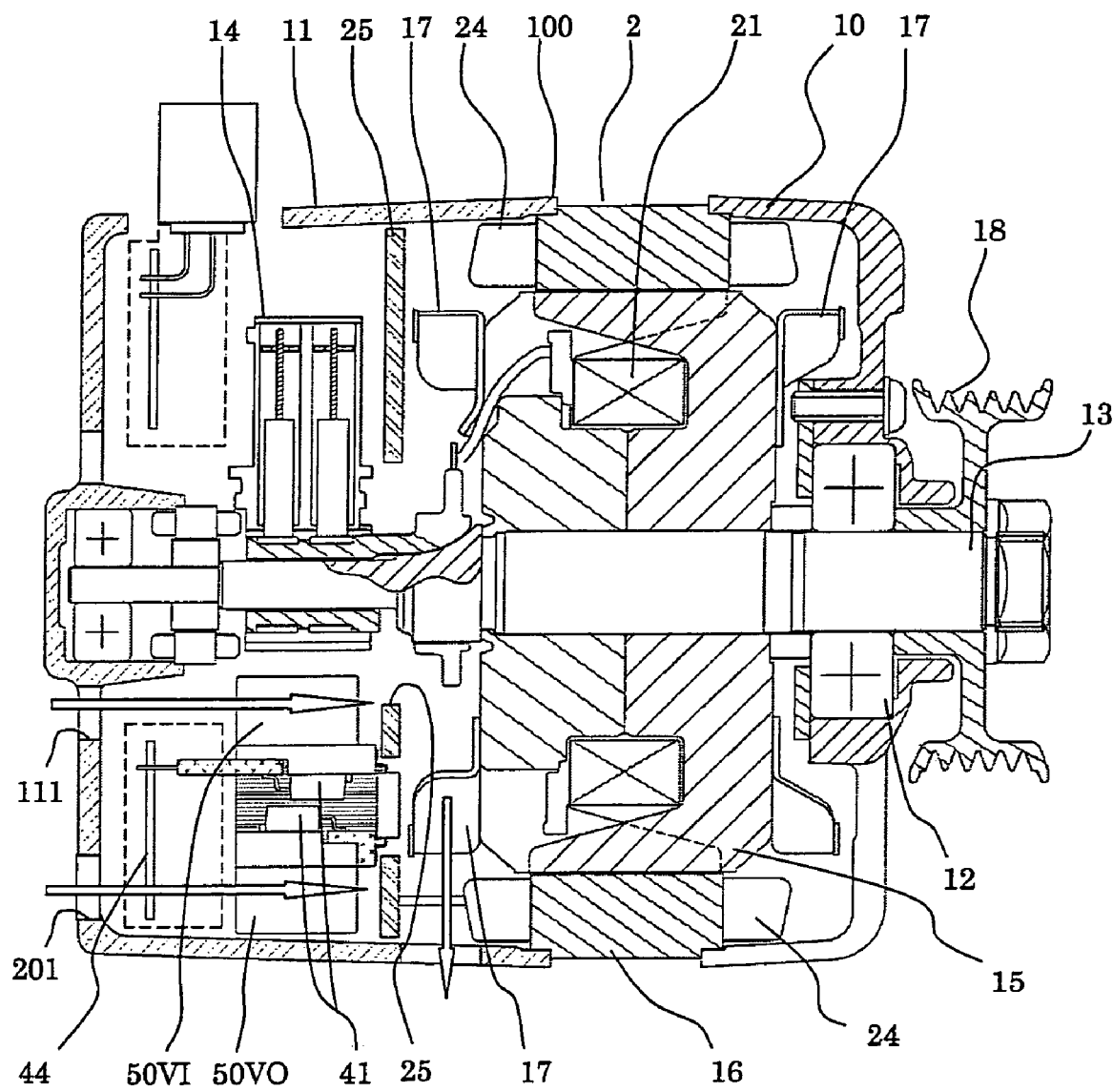
FIG. 6 is a view showing a third preferred embodiment of the invention, and is a vertical sectional side view showing an example of a structure of a rotary electric machine.

A third preferred embodiment of the invention will now be described, on the basis of FIG. 6. FIG. 6 is a vertical sectional side view showing an example of a structure of a rotary electric machine. In FIG. 6, parts the same as or equivalent to parts in FIG. 1 to FIG. 5 have been given the same reference numerals as in FIG. 1 to FIG. 5, and in the following description of this third preferred embodiment of the invention mainly the parts different from the foregoing first and second preferred embodiments of the invention will be described, and other description will be omitted.

In this third preferred embodiment, differently from in the first preferred embodiment described above, the rear bracket 11 is installed so as to cover the control circuit board 44a, the heat sinks 50UI, 50UO, 50VI, 50VO, 50WI, 50WO, and the switching devices 41 mounted on the heat sinks. An inlet opening 111 is provided in the center of the rear bracket 11 coaxially with the rotary shaft 13, and inlet holes 201 facing the heat-dissipating parts 50FO of the heat sinks 50VO, 50UO, 50WO directly in the rotary shaft length direction are provided around the inlet opening 111.

And, in this third preferred embodiment, an airflow hole 251 is provided coaxially with the rotary shaft 13 at the center of a support plate cum through hole formation plate 25 positioned between the fan 17 and the heat sinks 50UI, 50UO, 50VI, 50VO, 50WI, 50WO.

A cooling draft having been drawn in through the airflow openings 111, 251 in the rear bracket 11 by rotation of the fan 17 passes through the heat-dissipating parts 50FI, 50FO of the heat sinks 50UI, 50UO, 50VI, 50VO, 50WI, 50WO, goes via the airflow hole 251 in the support plate cum through hole formation plate 25, and is blown radially out in the radial direction of the rotary electric machine part 2 by the fan 17. The rest of the construction is the same as the construction of the first preferred embodiment described above.

In this third preferred embodiment also, as in the first preferred embodiment, the heat sinks 50UI, 50VI, 50WI (50VO, 50UO, 50WO) are arrayed divided up into a plurality in a substantially circumferential direction, and to match this construction of heat sinks, the cooling draft passage is also divided up in a substantially circumferential direction. Because of this, as in the first preferred embodiment described above, the airflow resistance encountered by the cooling draft is distributed and the overall pressure loss decreases. As a result, the draft volume flowing through the heat-dissipating parts 50FI, 50FO of the heat sinks increases and cooling effect improves. And, the noise of the rotary electric machine as a whole also decreases.

What is claimed is:

1. A rotary electric machine comprising:
   a rotary electric machine part;
   a switching circuit part for performing current control of this rotary electric machine part;
   a heat-dissipating device for cooling multiple switching devices constituting said switching circuit part; and
   a rotary electric machine,
   wherein the heat-dissipating device comprises multiple heat sinks arrayed in the circumferential direction of a rotary shaft of the rotary electric machine part so as to surround the rotary shaft and having the multiple switching devices distributed among and mounted upon said multiple heat sinks and are arrayed in the radial direction of the rotary shaft, and
   wherein shapes of the heat sinks arrayed in the circumferential direction of the rotary shaft are substantially identical or similar, and shapes of the heat sinks arrayed in the radial direction of the rotary shaft are substantially non-identical or non-similar.

2. A rotary electric machine according to claim 1, wherein spaces are formed between heat sinks adjacent in the circumferential direction of the rotary shaft, and lead wires of the rotary electric machine part are disposed in said spaces.

3. A rotary electric machine according to claim 2, wherein brushes for supplying electricity to a rotor of the rotary electric machine part and the multiple heat sinks are arrayed in the circumferential direction of the rotary shaft of the rotary electric machine part surrounding the rotary shaft in a common plane surrounding the rotary shaft.

4. A rotary electric machine according to claim 1, wherein brushes for supplying electricity to a rotor of the rotary electric machine part and the multiple heat sinks are arrayed in the circumferential direction of the rotary shaft of the rotary electric machine part surrounding the rotary shaft in a common plane surrounding the rotary shaft.

5. A rotary electric machine according to claim 1, wherein spaces are formed between the heat sinks adjacent in the radial direction of the rotary shaft, and the switching devices mounted on these adjacent heat sinks are disposed in said spaces.

6. A rotary electric machine according to claim 1, wherein spaces are formed between the heat sinks adjacent in the radial direction of the rotary shaft, and the switching devices mounted on these adjacent heat sinks are disposed in said spaces.

7. A rotary electric machine according to claim 1, wherein draft passages of a cooling draft for cooling the heat sinks are provided in correspondence with the heat sinks, and a heat-dissipating part of a corresponding one of the heat sinks is positioned in each of the draft passages.

8. A rotary electric machine according to claim 7,
wherein the cooling draft airflow resistance of the spaces between the heat sinks adjacent in the circumferential direction of the rotary shaft is greater than the cooling draft airflow resistance of the draft passages in which the heat-dissipating parts of the heat sinks are positioned.

9. A rotary electric machine according to claim 8, wherein the cooling draft airflow resistance of the spaces between the heat sinks adjacent in the radial direction of the rotary shaft is greater than the cooling draft airflow resistance of the draft passages in which the heat-dissipating parts of the heat sinks are positioned.

10. A rotary electric machine according to claim 7,
wherein the cooling draft airflow resistance of the spaces between the heat sinks adjacent in the radial direction of the rotary shaft is greater than the cooling draft airflow resistance of the draft passages in which the heat-dissipating parts of the heat sinks are positioned.

11. A rotary electric machine according to claim 1, wherein the heat sinks are cooled by a cooling draft created by a centrifugal fan having a center of rotation located at the center of rotation of the rotary shaft, and the cooling draft airflow resistance encountered by the cooling draft cooling the heat sinks on the radial direction inner side is greater than the cooling draft airflow resistance encountered by the cooling draft cooling the heat sinks on the radial direction outer side.

12. A rotary electric machine according to claim 1, wherein the heat sinks are cooled by a cooling draft created by a centrifugal fan having a center of rotation located at the center of rotation of the rotary shaft, and the surface areas for heat transfer to the cooling draft of the heat sinks on the radial direction inner side are smaller than the surface areas for heat transfer to the cooling draft of the heat sinks on the radial direction outer side.

13. A rotary electric machine according to claim 1, wherein inlet openings for a cooling draft for cooling the heat sinks are provided in the proximities of the cooling draft inflow sides of the heat sinks.

14. A rotary electric machine according to claim 1, wherein the current control is UVW 3-phase current control and the heat sinks arrayed in the circumferential direction of the rotary shaft so as to surround the rotary shaft and having the multiple switching devices distributed among and mounted upon the heat sinks are a U-phase heat sink with U-phase switching devices mounted thereon, a V-phase heat sink with V-phase switching devices mounted thereon, and a W-phase heat sink with W-phase switching devices mounted thereon.

15. A rotary electric machine according to claim 14, wherein the heat sinks of the phases are arrayed in the circumferential direction of the rotary shaft so as to surround the rotary shaft in an approximate U shape.

16. A rotary electric machine according to claim 14, wherein the heat sinks of the phases are arrayed in the circumferential direction of the rotary shaft so as to surround the rotary shaft in an approximate triangle shape.

17. A rotary electric machine according to claim 1, wherein the multiple switching devices and the heat-dissipating device are disposed adjacent to the rotary electric machine part in the length direction of the rotary shaft and the area occupied by the switching devices and the heat-dissipating device in the radial direction of the rotary shaft is within the area occupied by the rotary electric machine part in the radial direction.

18. A rotary electric machine according to claim 1, wherein fins of the heat sinks arrayed in the circumferential direction of the rotary shaft are substantially the same length, and fins of the heat sinks arrayed in the radial direction of the rotary shaft are different in length.

19. A rotary electric machine according to claim 18, wherein fins of radially outer heat sinks are longer than fins of radially inner heat sinks.

20. A rotary electric machine according to claim 1, wherein fins of the heat sinks arrayed in the circumferential direction of the rotary shaft are substantially the same thickness, and fins of the heat sinks arrayed in the radial direction of the rotary shaft are different in thickness.

21. A rotary electric machine according to claim 20, wherein fins of radially outer heat sinks are thicker than fins of radially inner heat sinks.

* * * * *